US009856795B2

United States Patent
Higashi et al.

(10) Patent No.: US 9,856,795 B2
(45) Date of Patent: Jan. 2, 2018

(54) GAS TURBINE SYSTEM, CONTROLLER, AND GAS TURBINE OPERATION METHOD

(71) Applicant: MITSUBISHI HITACHI POWER SYSTEMS, LTD., Kanagawa (JP)

(72) Inventors: Ryo Higashi, Kanagawa (JP); Yosuke Eto, Kanagawa (JP); Jun Sasahara, Kanagawa (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 404 days.

(21) Appl. No.: 14/760,787

(22) PCT Filed: Feb. 24, 2014

(86) PCT No.: PCT/JP2014/054375
§ 371 (c)(1),
(2) Date: Jul. 14, 2015

(87) PCT Pub. No.: WO2014/132932
PCT Pub. Date: Sep. 4, 2014

(65) Prior Publication Data
US 2015/0354466 A1 Dec. 10, 2015

(30) Foreign Application Priority Data
Feb. 26, 2013 (JP) ................. 2013-036376

(51) Int. Cl.
*F02C 9/26* (2006.01)
*F02C 9/28* (2006.01)
*F02C 9/40* (2006.01)

(52) U.S. Cl.
CPC ............... *F02C 9/263* (2013.01); *F02C 9/28* (2013.01); *F02C 9/40* (2013.01); *F05D 2220/75* (2013.01);
(Continued)

(58) Field of Classification Search
CPC .... F02C 9/00; F02C 9/263; F02C 9/28; F02C 9/40; F05D 2270/30; F05D 2270/3013; F05D 2270/303; F05D 2270/306
See application file for complete search history.

(56) References Cited

U.S. PATENT DOCUMENTS

2006/0005526 A1  1/2006  Tanaka et al.
2009/0193788 A1  8/2009  Szepek et al.

FOREIGN PATENT DOCUMENTS

CN         1932264       3/2007
CN         102725498     10/2012
(Continued)

OTHER PUBLICATIONS

Decision of Patent Grant dated Aug. 9, 2016 in Japanese Application No. 2015-502916, with English translation.
(Continued)

*Primary Examiner* — Arun Goyal
(74) *Attorney, Agent, or Firm* — Wenderoth, Lind & Ponack, L.L.P.

(57) ABSTRACT

The gas turbine system has: a gas turbine having a compressor, a combustor, and a turbine; a fuel supply mechanism for supplying fuel to the combustor; a composition detection unit for detecting the composition of the fuel; and a controller for controlling the flow rate of the fuel supplied from the fuel supply mechanism to the combustor, on the basis of a function of the exhaust temperature of exhaust gas passing through the turbine and either air pressure of air expelled from the compressor to the combustor or an expansion ratio of the turbine. The controller calculates the specific heat ratio of the combustion gas from the composition of the fuel detected by the composition detection unit, corrects the function on the basis of the calculated specific heat ratio, and controls the flow rate of the fuel on the basis of the corrected function.

6 Claims, 13 Drawing Sheets

(52) U.S. Cl.
CPC .... *F05D 2270/30* (2013.01); *F05D 2270/303* (2013.01); *F05D 2270/306* (2013.01); *F05D 2270/3013* (2013.01)

(56) References Cited

FOREIGN PATENT DOCUMENTS

| | | |
|---|---|---|
| JP | 63-183230 | 7/1988 |
| JP | 2009-216085 | 9/2009 |

OTHER PUBLICATIONS

International Search Report dated May 20, 2014 in international (PCT) Application No. PCT/JP2014/054375, with English translation.
Written Opinion of the International Searching Authority dated May 20, 2014 in International (PCT) Application No. PCT/JP2014/054375, with English translation.
Office Action dated Apr. 29, 2016 in corresponding Chinese Application No. 201480006320.6, with English translation.
Notice of Allowance dated Nov. 11, 2016 in corresponding Korean Application No. 10-2015-7020601, with English translation.
Notification of Grant of Invention Patent and Notification of Completion of Formalities for Registration dated Dec. 29, 2016 in corresponding Chinese Application No. 201480006320.6, with English translation.

GAS TURBINE SYSTEM, CONTROLLER, AND GAS TURBINE OPERATION METHOD

TECHNICAL FIELD

The present invention relates to a gas turbine system for supplying fuel gas to a combustor for combustion, a controller, and a gas turbine operation method.

BACKGROUND ART

In a gas turbine having a compressor, a combustor, and a turbine, fuel gas and air compressed by the compressor are combusted in the combustor, the generated combustion gas is supplied to the turbine, and the turbine is rotated. In order to increase the output or efficiency, it is desirable to operate the gas turbine with the temperature of the combustion gas at a turbine inlet increased as much as possible within an allowable range. In order to do so, there is a known method for controlling the flow rate of the fuel gas supplied to the combustor such that the combustion gas temperature becomes equal to a predetermined value using a relationship between the temperature of exhaust gas expelled from the turbine and the pressure of air expelled from the compressor in a case where the combustion gas temperature at the turbine inlet is constant (hereinafter, this control system is referred to as "temperature adjustment control"). Specifically, the temperature of the combustion gas at the turbine inlet decreases from the turbine inlet temperature to the exhaust gas temperature due to adiabatic expansion, which is caused by passing through the turbine, and mixing with cooling air from the turbine vanes or the like. That is, there are five main parameters which determine the exhaust gas temperature when a certain turbine inlet temperature is given, which are: the turbine expansion ratio which determines the temperature decrease amount of the combustion gas due to the adiabatic expansion, the turbine efficiency, the specific heat ratio of the combustion gas, and the volume of cooling air and the temperature of the cooling air which determine the temperature decrease amount due to mixing with the cooling air. When the four parameters of the turbine efficiency, the specific heat ratio of the combustion gas, the volume of the cooling air, and the temperature of the cooling air are assumed not to greatly change according to the operation state of the gas turbine, the exhaust gas temperature is uniquely determined at a certain turbine inlet temperature and a certain turbine expansion ratio. Conversely, it is possible to estimate the turbine inlet temperature from the turbine expansion ratio and the exhaust gas temperature. In the above-mentioned temperature adjustment control, the combustion gas temperature is made equal to a predetermined value by controlling the fuel flow rate such that the measured turbine expansion ratio and exhaust gas temperature match a function of a given turbine expansion ratio and exhaust gas temperature. Here, in the temperature adjustment control in practice, the above-mentioned compressor exhaust air pressure is generally used in place of the turbine expansion ratio given that the inlet pressure of the turbine is equal to the compressor exhaust air pressure apart from the combustor pressure loss and that the outlet pressure of the turbine is equal to the atmospheric pressure (approximately 1 atm) apart from the exhaust pressure loss.

However, particularly in gas turbines which use blast furnace gas or coal gas as fuel, there are cases where the composition of the fuel gas changes greatly. In this case, it is desirable to correct the function of the turbine expansion ratio and the exhaust gas temperature in the temperature adjustment control in consideration of the composition of the fuel gas. For example, Patent Document 1 discloses a gas turbine combustion temperature control method which controls combustion temperature by measuring the discharged air pressure of a gas turbine compressor and a gas turbine exhaust gas temperature, and controlling a gas turbine fuel flow rate on the basis of these measured values. This method includes detecting a calorific value of the gas turbine fuel, calculating changes in the exhaust gas temperature characteristics with respect to the discharged air pressure of the gas turbine compressor using the detected value of the calorific value, correcting the exhaust gas temperature characteristics using the calculated value, comparing the corrected value and an actual measured value of the exhaust gas temperature, and adjusting the fuel flow rate such that the difference in the comparison is minimized.

CITATION LIST

Patent Document

Patent Document 1: Japanese Unexamined Patent Application Publication No. S63-183230A

SUMMARY OF INVENTION

Technical Problem

The gas turbine combustion temperature control method according to Patent Document 1 aims to carry out temperature adjustment control by performing control by correcting the exhaust gas temperature characteristics using a calorific value of the gas turbine fuel such that the temperature of the combustion gas is equal to a predetermined temperature even when the fuel gas composition changes.

However, even with the control method according to Patent Document 1, since the actual temperature of the combustion gas deviates from the estimated temperature of the combustion gas, there are cases where the output or efficiency of the gas turbine is decreased as a result. More specifically, cases are conceivable where, even though the calorific values of fuel gases are the same, the compositions of the fuel gases are different. In such a case, since the compositions of the fuel gases are different even though the calorific values of the fuel gases are the same, the specific heat ratios of the combustion gases are also different and the exhaust gas temperatures are also different as a result. Thus, when controlling the fuel flow rate using exhaust gas temperature characteristics corrected using only the fuel gas calorific value, it is not possible to control the combustion gas temperature so as to be equal to a predetermined temperature. In general, it is not desirable for the temperature of the combustion gas to exceed the maximum allowable temperature of the gas turbine (over-firing) since the lifespan of the combustor or the turbine vanes will be shortened. In addition, since it is not possible to control the combustion gas temperature with high precision, the gas turbine must be operated with the combustion gas temperature decreased from the maximum allowable temperature, and such an operation leads to decreases in the output or efficiency of the gas turbine.

The present invention solves the problems described above and an object of the present invention is to provide a gas turbine system, a controller, and a gas turbine operation method, whereby the combustion gas temperature of a gas turbine can be controlled and the risk that over-firing may occur can be reduced.

Solution to Problem

According to the present invention for achieving the object described above, a gas turbine system includes a gas turbine having a compressor, a combustor, and a turbine, a fuel supply mechanism for supplying fuel to the combustor, a composition detection unit for detecting a composition of the fuel, and a controller for controlling a flow rate of the fuel supplied from the fuel supply mechanism to the combustor, on the basis of a function of an exhaust temperature of exhaust gas passing through the turbine and either air pressure of air expelled from the compressor to the combustor or an expansion ratio of the turbine. The controller calculates a specific heat ratio of a combustion gas from the composition of the fuel detected by the composition detection unit, corrects the function on the basis of the calculated specific heat ratio, and controls the flow rate of the fuel on the basis of the corrected function.

As described above, there are five main parameters which determine an exhaust gas temperature, which are the turbine expansion ratio, the turbine efficiency, the specific heat ratio of the combustion gas, the volume of the cooling air, and the temperature of the cooling air. When the composition of the turbine fuel gas changes, the relationship between the turbine expansion ratio and the exhaust gas temperature shifts from a reference state due to changes mainly in the specific heat ratio of the combustion gas out of these parameters. Therefore, it is possible to control the temperature of the combustion gas of the combustor with higher precision by correcting the function of the exhaust temperature of exhaust gas passing through the turbine and either air pressure of air expelled from the compressor to the combustor or the expansion ratio of the turbine on the basis of the specific heat ratio of the combustion gas, and adjusting the feed rate of the fuel gas on the basis of the correction result. In this manner, since the combustion gas temperature of the gas turbine can be controlled, it is possible to reduce the risk that over-firing may occur. In addition, since the temperature of the combustion gas of a combustor can be controlled with high precision and the risk that over-firing may occur can be reduced, it is possible to set the temperature of the combustion gas of the combustor to a higher temperature and to extract the output more efficiently in the gas turbine.

In the gas turbine system of the present invention, the controller calculates the composition of the combustion gas on the basis of the composition of the fuel and an intake flow rate of the compressor, and calculates the specific heat ratio of the combustion gas on the basis of a ratio of each component contained in the combustion gas and the specific heat ratio of each component.

Accordingly, it is possible to calculate the specific heat ratio of the combustion gas with high precision in consideration of the fuel-air ratio in the combustor.

In the gas turbine system of the present invention, the controller calculates a bias value on the basis of the calculated specific heat ratio of the combustion gas and a specific heat ratio of a reference combustion gas, and controls the flow rate of the fuel supplied to the combustor on the basis of a function obtained by adding the calculated bias value to the function for the reference combustion gas.

Accordingly, it is possible to obtain a corrected function using a small storage capacity and operation amount without setting a function for each specific heat ratio of the combustion gas.

In addition, according to the present invention, a controller controls a fuel supply mechanism for supplying fuel to a combustor of a gas turbine. The controller includes a composition information acquiring unit for acquiring composition information of fuel supplied to the combustor, and a fuel supply mechanism control unit for controlling a flow rate of the fuel supplied from the fuel supply mechanism to the combustor, on the basis of a function of an exhaust temperature of exhaust gas passing through the turbine and either air pressure of air expelled from the compressor to the combustor or an expansion ratio of the turbine. The fuel supply mechanism control unit calculates a specific heat ratio of the combustion gas from the composition of the fuel, corrects the function on the basis of the calculated specific heat ratio, and controls the flow rate of the fuel on the basis of the corrected function and operation information.

Accordingly, even in a case where the relationship between the turbine expansion ratio and the exhaust gas temperature shifts from a reference state due to changes in the composition of the turbine fuel gas and changes mainly in the specific heat ratio of the combustion gas, which is one of the main parameters determining the exhaust gas temperature, it is possible to control the combustion gas temperature of the gas turbine with high precision since it is possible to carry out control in accordance with the shift. Specifically, it is possible to control the temperature of the combustion gas of the combustor with higher precision by correcting the function of the exhaust temperature of exhaust gas passing through the turbine and either air pressure of air expelled from the compressor to the combustor or the expansion ratio of the turbine on the basis of the specific heat ratio of the combustion gas, and adjusting the feed rate of the fuel gas on the basis of the correction result. In this manner, since the combustion gas temperature of the gas turbine can be controlled, it is possible to reduce the risk that over-firing may occur. In addition, since the temperature of the combustion gas of the combustor can be controlled with high precision and the risk that over-firing may occur can be reduced, it is possible to set the temperature of the combustion gas of the combustor to a higher temperature and to extract the output more efficiently in the gas turbine.

In addition, a gas turbine operation method of the present invention is an operation method for a gas turbine, the gas turbine including a compressor, a combustor, and a turbine, a fuel supply mechanism for supplying fuel to the combustor, and a composition detection unit for detecting a composition of the fuel. The gas turbine operation method includes the steps of: calculating a specific heat ratio of a combustion gas from the composition of the fuel detected by the composition detection unit; correcting a function of an exhaust temperature of exhaust gas passing through the turbine and either air pressure of air expelled from the compressor to the combustor or an expansion ratio of the turbine, which is determined beforehand, on the basis of the calculated specific heat ratio; and controlling the fuel supplied from the fuel supply mechanism to the combustor on the basis of the corrected function.

Accordingly, even in a case where the relationship between the turbine expansion ratio and the exhaust gas temperature shifts from a reference state due to changes in the composition of the turbine fuel gas and changes mainly in the specific heat ratio of the combustion gas, which is one of the main parameters determining the exhaust gas temperature, it is possible to control the combustion gas temperature of the gas turbine with high precision since it is possible to carry out control in accordance with the shift. Specifically, it is possible to control the temperature of a combustion gas of a combustor with higher precision by correcting a function of the exhaust temperature of exhaust gas passing through the turbine and either air pressure of air expelled from the compressor to the combustor or the expansion ratio of the turbine on the basis of the specific heat ratio of the combustion gas, and adjusting the feed rate of the fuel gas on the basis of the correction result. In this manner, since the combustion gas temperature of the gas turbine can be controlled, it is possible to reduce the risk that over-firing may occur. In addition, since the temperature of the combustion gas of the combustor can be controlled with high precision and the risk that over-firing may occur can be reduced, it is possible to set the temperature of the combustion gas of the combustor to a higher temperature and to extract the output more efficiently in the gas turbine.

Advantageous Effect of Invention

According to the gas turbine system, the controller, and the gas turbine operation method of the present invention, it is possible to control the temperature of a combustion gas so as to correspond to changes in the composition of a fuel gas supplied to a combustor. Accordingly, it is possible to reduce the risk that over-firing may occur. As a result, it is possible to set the temperature of the combustion gas of the combustor to a higher temperature, and to extract the output more efficiently in the gas turbine.

DESCRIPTION OF EMBODIMENTS

Detailed description will be given below of preferred embodiments of a gas turbine system, a controller, and a gas turbine operation method according to the present invention with reference to the attached drawings. Note that the invention is not limited by the embodiment, and when a plurality of embodiments is present, the invention is intended to include a configuration combining these embodiments.

Embodiments

Figure 1:
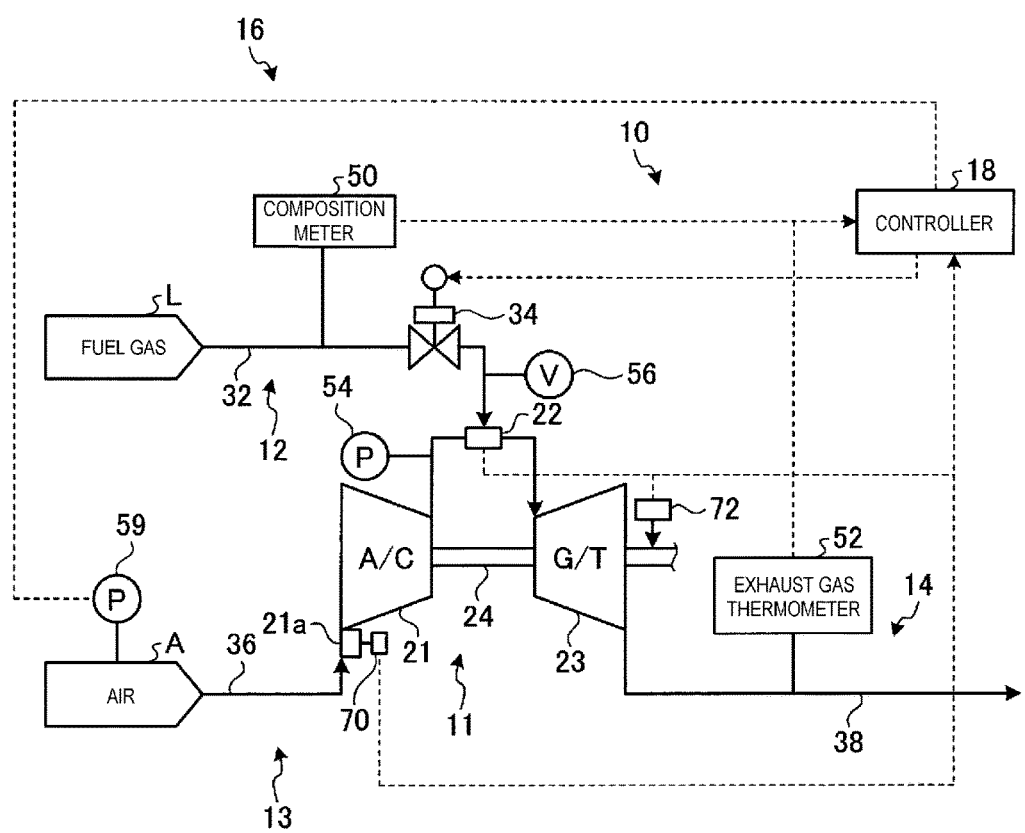
FIG. 1 is a schematic configuration diagram representing a gas turbine system of the present embodiment.

FIG. 1 is a schematic configuration diagram representing a gas turbine system of the present embodiment. In the present embodiment, as illustrated in FIG. 1, a gas turbine system 10 includes a gas turbine 11, a fuel gas supply mechanism 12 for supplying fuel gas to the gas turbine 11, an air supply mechanism 13 for supplying air to the gas turbine 11, an exhaust gas expelling mechanism 14 in which exhaust gas expelled from the gas turbine 11 flows, an operation information detection unit 16 for detecting various types of operation information of the gas turbine 11, and a controller 18 for controlling an operation of each unit of the gas turbine system 10 on the basis of input settings, input instructions, results detected by the detection unit, and the like.

The gas turbine 11 includes a compressor (A/C) 21, a combustor 22, and a turbine (G/T) 23, and the compressor 21 and the turbine 23 are linked by a rotating shaft 24 so as to be able to integrally rotate. In addition, in the gas turbine 11, the compressor 21 and the combustor 22 are connected and the combustor 22 and the turbine 23 are connected. The compressor 21 compresses air A taken in from the air supply mechanism 13 and changes the amount of the air A taken in by changing the angle of an inlet guide vane 21a provided at the inlet of the compressor 21. The combustor 22 carries out combustion by mixing compressed air supplied from the compressor 21 and fuel gas L supplied from a fuel gas supply line 32. The turbine 23 is rotated by combustion gas generated by combusting the fuel gas L in the combustor 22 being supplied thereto. The compressor 21 is provided with the inlet guide vane (IGV) 21a which is able to adjust the extent of opening of an air intake port. The compressor 21 increases the compressed air amount generated by the compressor 21 by increasing the extent of opening of the inlet guide vane 21a and decreases the compressed air amount generated by the compressor 21 by reducing the extent of opening. Although not illustrated, the turbine 23 is supplied with the compressed air compressed by the compressor 21 through a casing, and cools blades and the like by using this compressed air as cooling air.

The fuel gas supply mechanism 12 includes the fuel gas supply line 32 and a control valve 34. The fuel gas supply line 32 is a pipe for connecting a supply source for supplying fuel gas and the combustor 22. The fuel gas supply line 32 supplies fuel gas supplied from the supply source to the combustor 22. The control valve 34 is a valve provided with a mechanism for adjusting the extent of opening and is provided in the fuel gas supply line 32. The control valve 34 is able to adjust the flow rate of the fuel gas L supplied from the fuel gas supply line 32 to the combustor 22 by opening and closing or adjusting the extent of opening.

The air supply mechanism 13 is provided with an air supply line 36. One end of the air supply line 36 is opened to the atmosphere and the other is linked with the compressor 21. The air supply line 36 supplies the air A to the compressor 21.

The exhaust gas expelling mechanism 14 is provided with an exhaust gas line 38. The exhaust gas line 38 is linked with the turbine 23 and exhaust gas passing through the turbine 23 (combustion gas passing through the turbine 23) is supplied to the exhaust gas line 38. The exhaust gas line 38 supplies exhaust gas to a mechanism for processing exhaust gas, for example, an exhaust heat recovery mechanism, a mechanism for removing toxic substances, or the like.

The operation information detection unit 16 includes a composition meter 50, an exhaust gas thermometer 52, a compressed air pressure gauge 54, a fuel flow meter 56, a barometer 59, an inlet guide vane angle meter (an IGV opening extent meter) 70, and a rotation speed meter 72. Each of these units sends detected information to the controller 18. The composition meter 50 is provided in the fuel gas supply line 32 and detects the composition of the fuel gas flowing in the fuel gas supply line 32. As the composition meter 50, it is possible to use various types of measuring devices for measuring the composition of fuel gas, and it is possible to use a sensor which irradiates fuel gas with measuring light, detects absorption of the measuring light, and detects the target component on the basis of the absorption amount, or a sensor which detects the Raman scattering light of measuring light and detects the target component on the basis of the intensity of the Raman scattering light. The composition meter 50 may be provided with separate sensors for detecting each of the components to be detected, or may detect all of the components of the fuel gas with one sensor. Here, it is sufficient if the composition meter 50 is able to detect the main components contained in the fuel gas, and the composition meter 50 does not necessarily need to detect minor components. The exhaust gas thermometer 52 is provided in the exhaust gas line 38 and detects the temperature of the exhaust gas flowing in the exhaust gas line 38, commonly called the exhaust temperature. The compressed air pressure gauge 54 detects the pressure of compressed air flowing from the compressor 21 toward the combustor 22. The compressed air pressure gauge 54 measures the discharge pressure of the compressor 21. The fuel flow meter 56 is arranged between the control valve 34 of the fuel gas supply line 32 and the combustor 22. The fuel flow meter 56 measures the flow rate of the fuel gas passing through the control valve 34 and supplied to the combustor 22. The barometer 59 is a pressure gauge for detecting the atmospheric pressure. As long as the barometer 59 is able to detect the atmospheric pressure in the space where the gas turbine system 10 is installed, the installation position of the barometer 59 is not particularly limited. The inlet guide vane angle meter 70 is a measuring instrument for detecting the angle of the inlet guide vane 21a provided at the inlet of the compressor 21. The rotation speed meter 72 is a measuring instrument for detecting the rotation speed of the gas turbine 11. As the rotation speed meter 72, an encoder provided in a shaft rotating coaxially with the rotating shaft 24 of the gas turbine 11 can be used.

Figure 2:
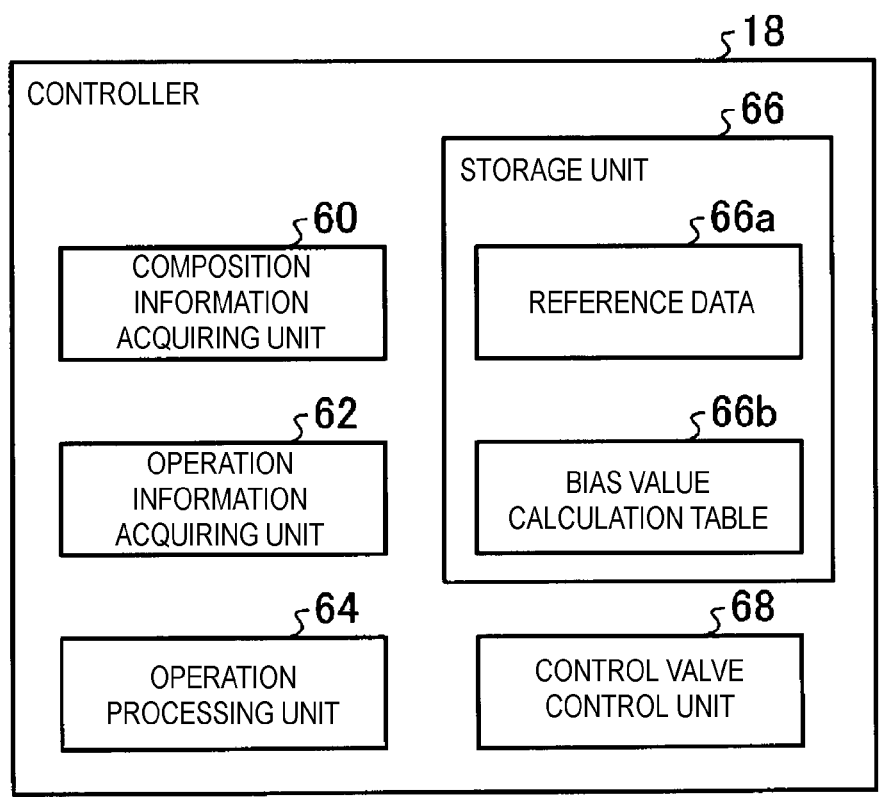
FIG. 2 is a schematic diagram illustrating a controller of a gas turbine system.

The controller 18 controls the operation of each unit of the gas turbine system 10. Description will be given of the configuration of the controller 18 using FIG. 2. FIG. 2 is a schematic diagram illustrating the controller of the gas turbine system. Here, FIG. 2 is an extract of a portion relating to a function for controlling the supply of the fuel gas, out of the functions of the controller 18. The controller 18 is provided with various types of functions which are necessary for control of the gas turbine system 10 apart from the function illustrated in FIG. 2.

The controller 18 includes a composition information acquiring unit 60, an operation information acquiring unit 62, an operation processing unit 64, a storage unit 66, and a control valve control unit (a fuel gas supply mechanism control unit) 68. The composition information acquiring unit 60 acquires information on the composition of the fuel gas detected by the composition meter 50. The operation information acquiring unit 62 acquires the temperature of the exhaust gas detected by the exhaust gas thermometer 52, the pressure of compressed air detected by the compressed air pressure gauge 54, and information on the flow rate of the fuel gas detected by the fuel flow meter 56.

The operation processing unit 64 is provided with a central processing unit (CPU) and a buffer and is provided with a function for executing various types of operations by executing a program. The operation processing unit 64 calculates the extent of opening of the control valve 34 on the basis of information on the composition of the fuel gas acquired by the composition information acquiring unit 60, operation information acquired by the operation information acquiring unit 62, and information stored in the storage unit 66, and controls the flow rate of the fuel gas supplied to the combustor 22. This point will be described later.

Figure 3:
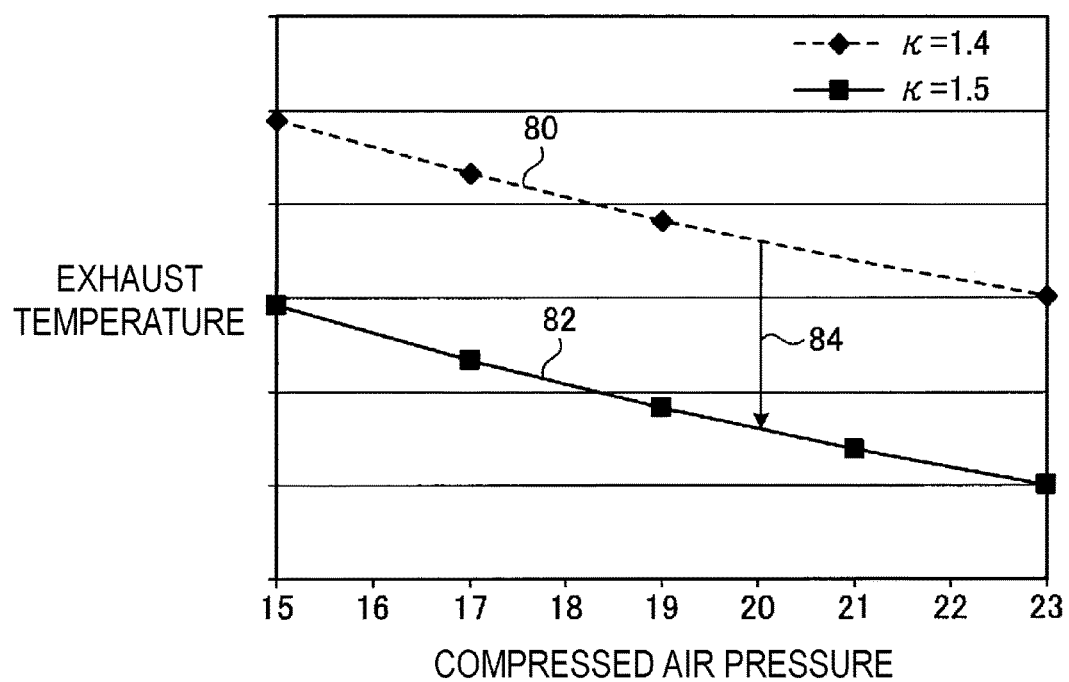
FIG. 3 is a graph showing an example of a temperature control curve.

The storage unit 66 includes reference data 66a and a bias value calculation table 66b. The reference data 66a stores information on a temperature control curve in the case of the composition of the reference fuel gas. FIG. 3 is a graph showing an example of the temperature control curve (a curve indicating a relationship between control setting values). Specifically, as shown in FIG. 3, the temperature control curve is a function of the pressure of the compressed air and the exhaust temperature such that the inlet temperature of the turbine 23 is constant. Here, the compressor exhaust air pressure (compressed air pressure) is substantially the turbine expansion ratio; however, as described above, considering that the inlet pressure of the turbine 23 is equal to the compressor exhaust air pressure apart from the pressure loss of the combustor 22 and that the outlet pressure of the turbine 23 is equal to the atmospheric pressure (approximately 1 atm) apart from the exhaust pressure loss, the pressure of compressed air (the pressure of the compressed air at a position measured by the compressed air pressure gauge 54) is used as a substitute for the turbine expansion ratio. The exhaust temperature is the temperature of the exhaust gas (the temperature of the exhaust gas at a position measured by the exhaust gas thermometer 52). In the gas turbine system 10, when the fuel composition does not change and is the same as the reference, it is possible to make the temperature of the combustion gas supplied to the turbine equal to a desired temperature by performing an operation under the conditions indicated by a temperature control curve 80 for that case.

For example, as shown in FIG. 3, in the composition of the reference fuel gas, K of the combustion gas is 1.4 and the temperature control curve in that case is the temperature control curve 80. In a case where the composition of the fuel gas subsequently changes and K of the combustion gas becomes 1.5 as a result, the temperature control curve becomes a temperature control curve 82. The shift amount of the temperature control curve 82 from the temperature control curve 80 as a reference is a bias value 84. The bias value calculation table 66b is a table storing the relationship between a specific heat ratio K of the combustion gas calculated from the composition of the fuel gas and a bias value for bias-correcting the temperature control curve 80 of the reference data. The relationship in the bias value calculation table 66b between the specific heat ratio K and the bias value may be calculated by an experiment or by simulation. Furthermore, the relationship is not necessarily such that the temperature of the combustion gas is constant with respect to changes in K of the combustion gas, and a different relationship may be used according to the purpose. In addition, a table is used in the present embodiment; however, simply, a function may be used, or, for example, a ratio of a bias value with respect to the shift amount described above may be stored. In a case where K is 1.5, the operation processing unit 64 calculates the temperature control curve 82 by calculating the bias value 84 from the bias value calculation table 66b or from the function described above, and correcting the temperature control curve 80 with the bias value 84. This point will be described later.

Figure 4:
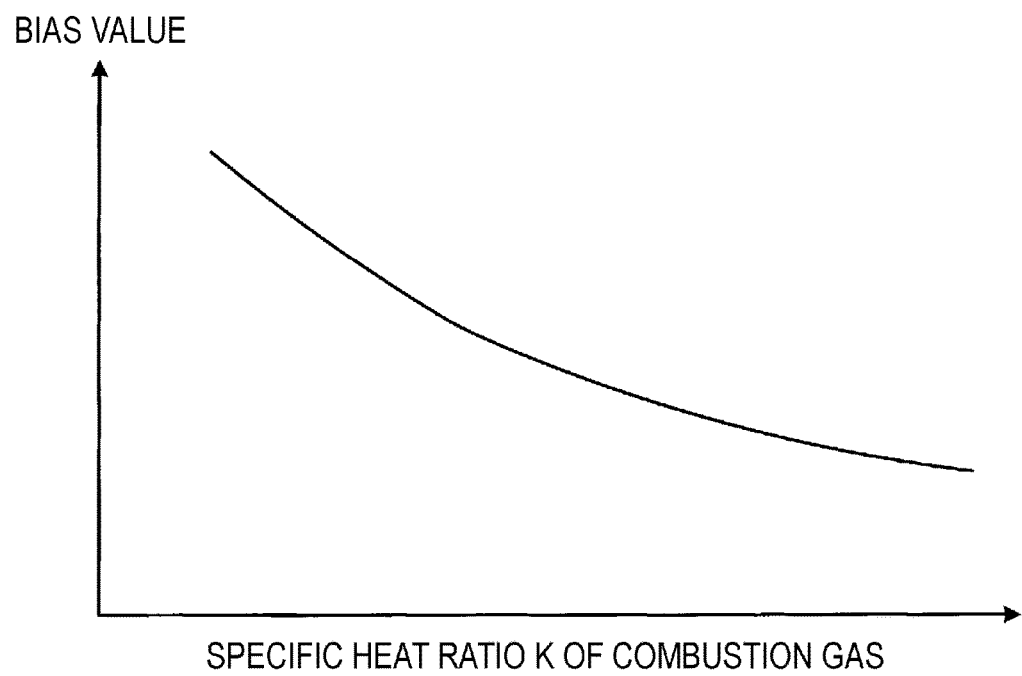
FIG. 4 is a graph showing an example of a relationship between a specific heat ratio and a bias value.
Figure 5:
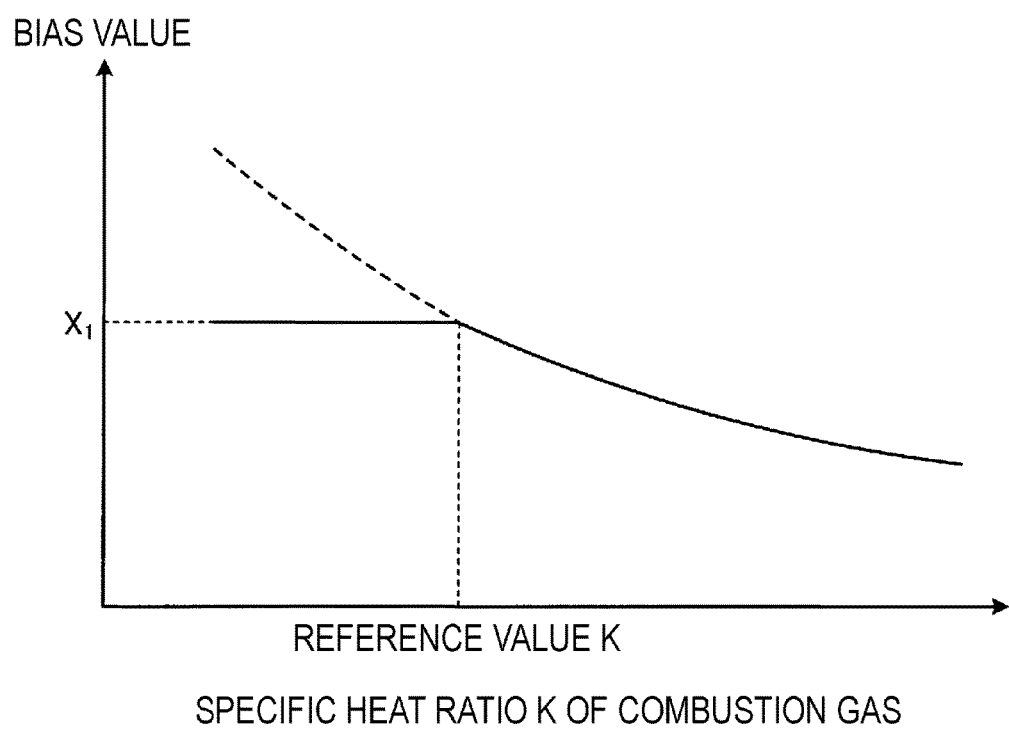
FIG. 5 is a graph showing an example of a relationship between a specific heat ratio and a bias value.
Figure 6:
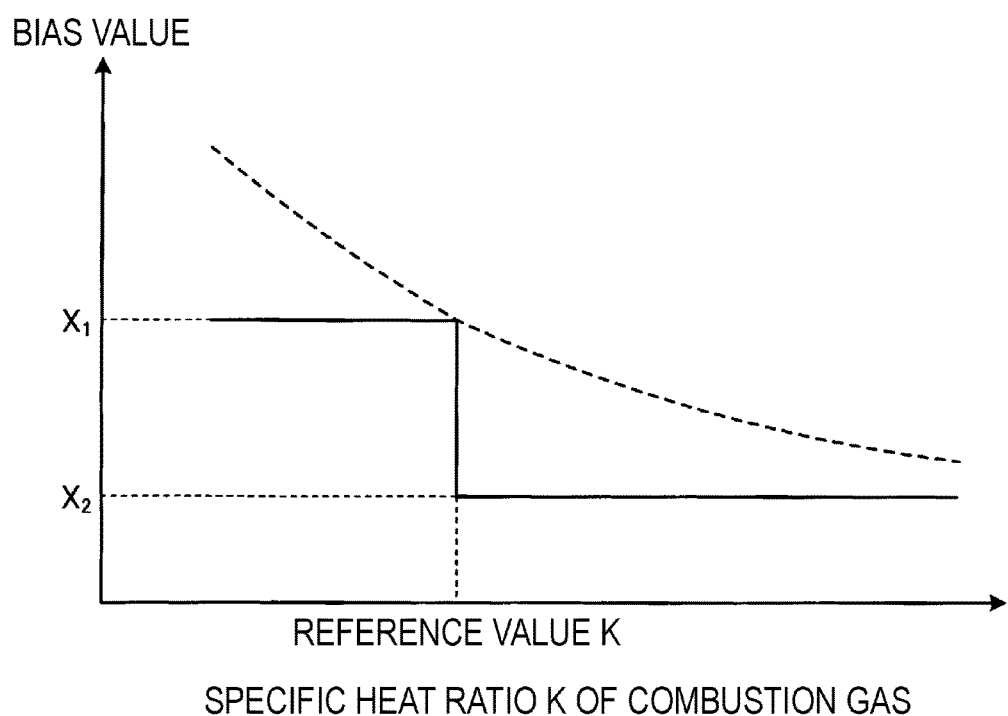
FIG. 6 is a graph showing an example of a relationship between a specific heat ratio and a bias value.

Description will be given below of the relationship between a specific heat ratio and a bias value which can be used for the present embodiment, using FIG. 4 to FIG. 6. FIG. 4 to FIG. 6 are each a graph showing an example of a relationship between a specific heat ratio and a bias value. As shown in FIG. 4, it is possible to make a relationship between the specific heat ratio K and a bias value to be stored in the bias value calculation table 66b a relationship where the temperature adjustment bias is changed according to the specific heat ratio K such that the temperature of the combustion gas is constant without being affected by the specific heat ratio K of the combustion gas. The controller 18 is able to reduce the changes in the temperature of the combustion gas which occur in a case where the specific heat ratio K of the combustion gas changes, by controlling the bias value using the relationship shown in FIG. 4.

In addition, as the relationship between the specific heat ratio K and the bias value to be stored in the bias value calculation table 66b, as shown in FIG. 5, it is possible to use a relationship such that the bias value is a constant value X1 in a case where the specific heat ratio K of the combustion gas is equal to a reference value K or less, and that the temperature of the combustion gas is constant without being affected by the specific heat ratio K of the combustion gas in a case where the specific heat ratio K of the combustion gas is greater than the reference value K. By controlling the bias value using the relationship shown in FIG. 5, the controller 18 linearly changes the temperature adjustment bias according to the specific heat ratio K such that the temperature of the combustion gas is constant without being affected by the specific heat ratio K of the combustion gas in a case where the specific heat ratio K of the combustion gas is greater than the reference value K. Thus, the controller 18 is able to carry out control such that the temperature is constant in a case where the composition of the fuel gas changes to the over-firing side. In addition, by controlling the bias value using the relationship shown in FIG. 5, the controller 18 sets the bias value to the constant value X1 in a case where the specific heat ratio K of the combustion gas is equal to the reference value K or less. Thus, in a case where the specific heat ratio K of the combustion gas calculated from the detected composition of the fuel gas is lower than a reference value, even when the specific heat ratio K which is lower than the actual specific heat ratio K of the combustion gas is calculated due to error or the like in a measuring instrument, combustion can be performed under conditions where there is less risk that over-firing may occur.

In addition, as shown in FIG. 6, as the relationship between the specific heat ratio K and a bias value to be stored in the bias value calculation table 66b, it is possible to use a relationship where the bias value is the constant value X1 in a case where the specific heat ratio K of the combustion gas is equal to the reference value K or less and the bias value is a constant value X2 in a case where the specific heat ratio K of the combustion gas is greater than the reference value K. Here, X2 is a smaller value than X1, that is, X2<X1. Also when the controller 18 controls the bias value using the relationship shown in FIG. 6 such that the bias value is switched according to whether the specific heat ratio K of the combustion gas is greater than the reference value K or is equal to the reference value K or less, it is possible to perform combustion under conditions where there is less risk that over-firing may occur by reducing the bias value when a state is reached where the specific heat ratio K of the combustion gas is high and over-firing is likely to occur if the combustion conditions remain the same. Here, in FIG. 6, the bias value is switched in two stages on the basis of the specific heat ratio K of the combustion gas; however, there may be three or more stages.

The control valve control unit 68 controls the control valve 34 on the basis of the extent of opening of the control valve 34 calculated by the operation processing unit 64.

Figure 7:
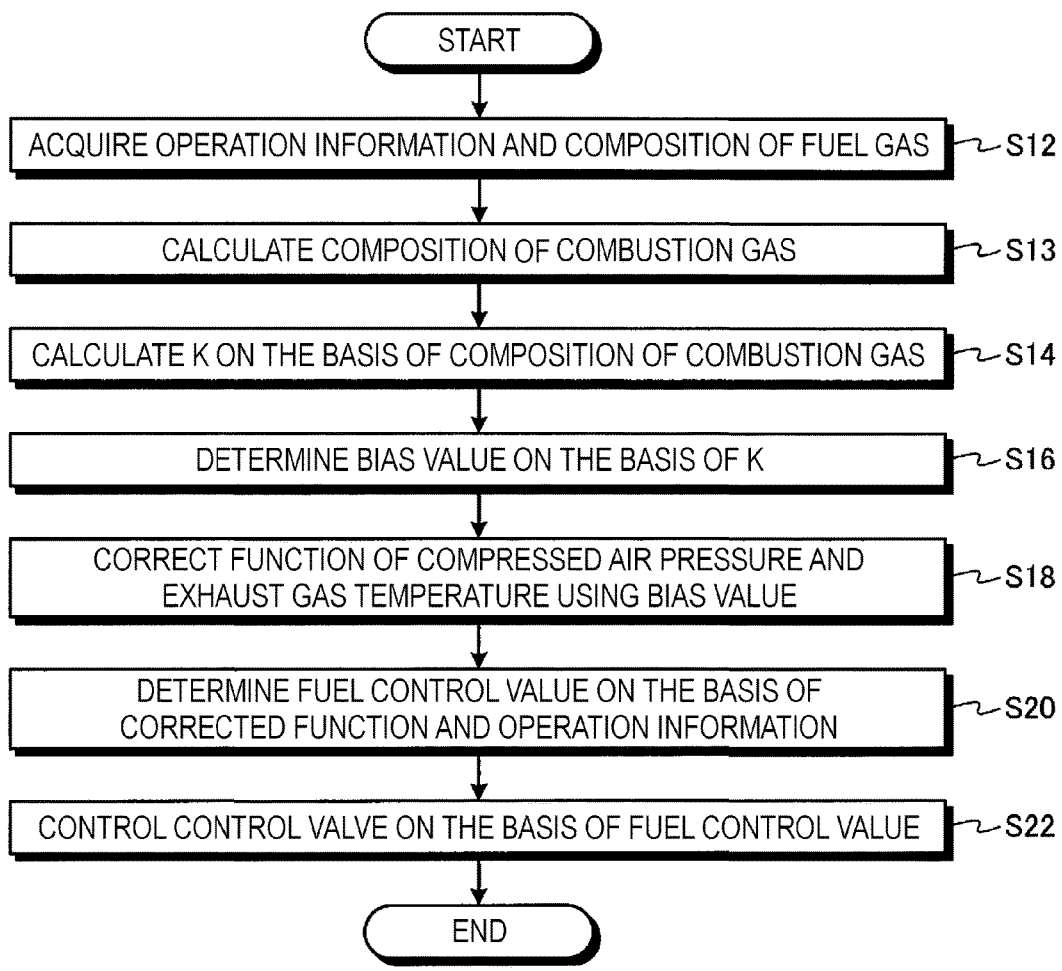
FIG. 7 is a flowchart showing an example of a driving operation of the gas turbine system of the present embodiment.

Next, description will be given of control operations by the controller, using FIG. 7. FIG. 7 is a flowchart showing an example of a driving operation of the gas turbine system of the present embodiment. The controller 18 repeatedly executes the process shown in FIG. 7 during the operation of the gas turbine 11. The controller 18 acquires operation information and the composition of the fuel gas (Step S12). The controller 18 acquires information on the composition of the fuel gas with the composition information acquiring unit 60 and acquires various types of operation information with the operation information acquiring unit 62.

The controller 18 calculates the composition of the combustion gas after acquiring the fuel gas and operation information (Step S13). Specifically, the controller 18 calculates the composition of the fuel gas after combustion on the basis of the acquired fuel gas composition. For example, $H_2$ becomes $H_2O$ after combustion, CO becomes $CO_2$ after combustion, and $CH_4$ becomes $CO_2$ and $H_2O$ after combustion. Using a relationship where nitrogen, carbon dioxide, or water, which are incombustible components, do not change, or the like, the composition of gas generated in a case where the fuel gas is completely combusted is calculated. Next, the controller 18 calculates the feed rate of the air on the basis of the angle of the inlet guide vane 21a detected by the inlet guide vane angle meter 70, the intake temperature, and the rotation speed of the compressor detected by the rotation speed meter 72, and additionally calculates the air-fuel ratio on the basis of the feed rate of the fuel gas and the feed rate of the air. Next, the controller 18 detects the composition of the combustion gas on the basis of the composition of gas generated in a case where fuel gas is completely combusted, and the air-fuel ratio. In other words, the ratio of surplus air which does not contribute to combustion is calculated on the basis of the air-fuel ratio and the composition of the combustion gas is calculated assuming that the gas generated in a case where fuel gas is completely combusted is diluted with the surplus air.

The controller 18 calculates K of the combustion gas on the basis of the composition of the combustion gas (Step S14). Specifically, K of each component of the combustion gas is extracted on the basis of the composition of the combustion gas. After that, the specific heat ratio of the combustion gas is calculated on the basis of the specific heat ratio of the components contained in the combustion gas and the ratio of each of the components of the combustion gas. As the calculation method, it is possible to carry out calculation using a weighted average on the basis of the concentration of each of the components.

After calculating the specific heat ratio K of the combustion gas, the controller 18 determines the bias value on the basis of the specific heat ratio K of the combustion gas (Step S16). Specifically, the controller 18 reads out the bias value calculation table 66b and determines a bias value corresponding to the specific heat ratio K of the combustion gas on the basis of the bias value calculation table 66b and the calculated specific heat ratio K of the combustion gas.

After determining the bias value, the controller 18 corrects a function of the compressed air pressure and the exhaust gas temperature using the bias value (Step S18). In other words, the controller 18 obtains a corrected temperature control curve by adding the bias value to the reference temperature control curve.

After correcting the function (temperature control curve) of the compressed air pressure and the exhaust gas temperature with the bias value, the controller 18 determines a fuel control value (a value used for controlling the feed rate of the fuel gas) on the basis of the corrected temperature control curve (function) and operation information (Step S20). Specifically, in FIG. 3, a set of the measured compressed air pressure and exhaust gas temperature is plotted, and the fuel control value is determined such that the fuel flow rate is decreased in a case where the set is above and to the right of the corrected temperature control curve and that the fuel flow rate is increased in a case where the set is below left. The control valve 34 is controlled on the basis of the fuel control value determined by the control valve control unit 68 (Step S22), and the present process ends. Here, the fuel control value may be information on a value indicating the extent of opening of the control valve 34 or information on the amount of change in the extent of opening.

As described above, the gas turbine system 10 detects the composition of the fuel gas, calculates the specific heat ratio K of the combustion gas on the basis of the composition of the fuel gas, calculates a bias value on the basis of a relationship set beforehand, and corrects the temperature control curve using the bias value. Thus, even in a case where the composition of the fuel gas changes, it is possible to correct the temperature control curve according to these changes. By correcting the temperature control curve, the gas turbine system 10 is able to set the relationship between the exhaust temperature and the temperature of the combustion gas at the turbine inlet so as to correspond to the composition of the fuel gas. Thus, by controlling the operation conditions (the feed rate of the fuel gas in the present embodiment) on the basis of the corrected temperature control curve, it is possible to reduce the difference between the predicted temperature of the combustion gas at the turbine inlet and the actual temperature. Accordingly, it is possible to control the gas turbine system 10 with higher precision and to operate the gas turbine system 10 with a higher output and efficiency. Specifically, when the temperature control curve is controlled using the calories of the fuel gas, control is carried out using the same temperature control curve for fuel gases whose compositions are different even though the calories are the same. By contrast, when the composition of the fuel gas changes, the gas turbine system 10 of the present embodiment is able to calculate K of the combustion gas corresponding to the composition of the fuel gas and correct the temperature control curve. Thus, it is possible to more accurately control the combustion in the combustor 22 and to reduce the risk that over-firing may occur. In addition, the gas turbine system 10 is able to bring the target temperature close to the maximum allowable temperature of the gas turbine 11 by being able to reduce error between the target temperature of the combustion gas at the turbine inlet and the actual temperature. Therefore, it is possible to efficiently operate the gas turbine system 10.

Here, the gas turbine system 10 is able to reduce changes in the actual temperature by calculating a bias value, for example, using the relationship shown in FIG. 4, and to reduce the risk that over-firing may occur, as well as to perform an operation while maintaining a state of being close to the maximum allowable temperature even in a case where the specific heat ratio K of the combustion gas changes. In addition, the gas turbine system 10 is able to appropriately control the temperature in a case where the specific heat ratio K of the combustion gas changes to the over-firing side relative to the reference value K by calculating a bias value, for example, using the relationship shown in FIG. 4, and to reduce the risk that over-firing may occur.

Here, in the present embodiment, the temperature control curve is a function of the compressed air pressure and the exhaust temperature; however, the turbine expansion ratio may be used in place of the compressed air pressure. In this case, the compressed air pressure may be used as a substitute for the turbine inlet pressure in order to determine the turbine expansion ratio, or the atmospheric pressure may be used as a substitute for the turbine exhaust pressure. In addition, description is given in the present embodiment with the fuel being gas; however, it is clear that the form of the fuel is essentially not limited to a gas and the fuel may be, for example, liquid fuel.

Figure 8:
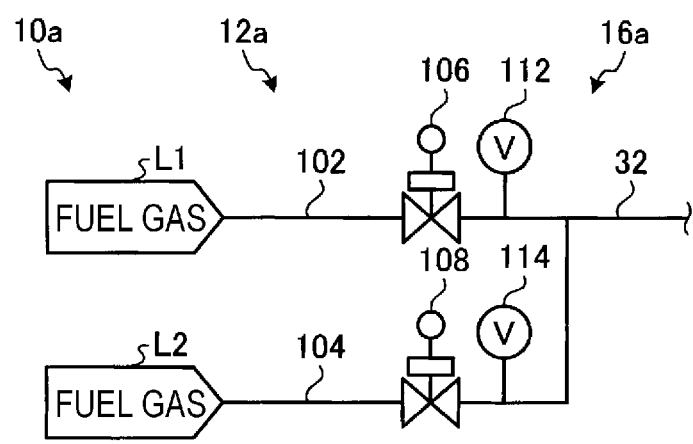
FIG. 8 is a schematic diagram illustrating another example of a fuel gas supply mechanism.

The gas turbine system 10 detects the composition of the fuel gas using a composition meter; however, the present invention is not limited thereto. FIG. 8 is a schematic diagram illustrating another example of a fuel gas supply mechanism. A gas turbine system 10*a* illustrated in FIG. 8 is the same as the gas turbine system 10 apart from the configuration on the upstream side of the fuel gas supply line 32. Description will be given of the configuration unique to the gas turbine system 10*a*.

In the gas turbine system 10*a* illustrated in FIG. 8, a fuel gas supply mechanism 12*a* includes a first fuel gas supply line 102 through which a fuel gas L1 is supplied, a second fuel gas supply line 104 through which a fuel gas L2 is supplied, a control valve 106 provided in the first fuel gas supply line 102, and a control valve 108 provided in the second fuel gas supply line 104. The fuel gas supply mechanism 12*a* supplies the fuel gas L1 from the first fuel gas supply line 102 to the fuel gas supply line 32 and supplies the fuel gas L2 from the second fuel gas supply line 104 to the fuel gas supply line 32. Here, in the present embodiment, the control valves 106 and 108 which are able to adjust the flow rates of the first fuel gas supply line 102 and the second fuel gas supply line 104 are provided; however, the control valves 106 and 108 need not be provided. In addition, the fuel gas L1 and the fuel gas L2 in the present embodiment are fuel gases whose composition is known.

An operation information detection unit 16*a* also includes a fuel flow meter 112 provided in the first fuel gas supply line 102 and a fuel flow meter 114 provided in the second fuel gas supply line 104. The fuel flow meters 112 and 114 calculate the fuel flow rates of the lines provided with these fuel flow meters.

Figure 9:
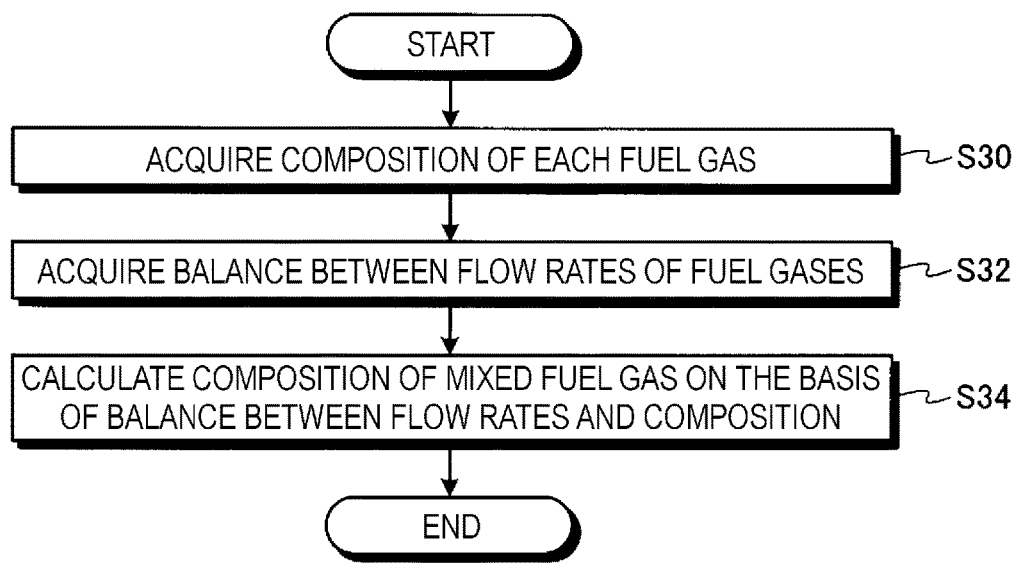
FIG. 9 is a flowchart showing an example of a driving operation of a gas turbine system of another example.

Next, description will be given of a method for calculating the composition of the fuel gas of the gas turbine system 10*a*, using FIG. 9. FIG. 9 is a flowchart showing an example of a driving operation of a gas turbine system of another example. Here, the operation shown in FIG. 9 may be performed by the controller 18, or may be performed by providing a separate operation apparatus. The controller 18 performs the operation in the present embodiment.

The controller 18 acquires the compositions of each fuel gas, that is, the fuel gases L1 and L2 (Step S30), acquires a balance between the flow rates of the fuel gases from the fuel flow meters 112 and 114 (Step S32), calculates the composition of the mixed fuel gas on the basis of the balance between the flow rates and the compositions of the fuel gases (Step S34), and ends the present process. Here, with regard to the balance between the flow rates, it is sufficient if a relative balance is acquired, and the flow rates may be acquired or a flow rate ratio may be detected.

As with the gas turbine system 10a, in a case where the composition of the fuel gas is known or in a case where such can be regarded as known, it is possible to calculate the composition of the fuel gas supplied to the combustor without detecting the composition of the fuel gas using a composition meter. In addition, it is possible to simplify the configuration of the apparatus by not using a composition meter. In addition, the gas turbine system 10a mixes two types of fuel gas; however, the number of fuel gases to be mixed is not particularly limited.

In addition, it is preferable that the gas turbine systems 10 and 10a set a reference value with respect to the composition of the fuel gas, and switch controls to be executed according to whether or not the composition of the fuel gas has changed to the over-firing side relative to the reference value. In other words, it is preferable that the gas turbine systems 10 and 10a set a reference value with respect to K which is a specific heat ratio calculated on the basis of the composition of the fuel gas, and switch controls to be executed between a case where K has changed to the over-firing side relative to the reference value, in other words, a case where K has increased, and a case where K has changed to the opposite side to the over-firing side, in other words, a case where K has decreased.

As an example, in a case where K has become greater than the reference value, the controller 18 calculates a bias value and executes control (decreases the bias) on the basis of the bias value, and in a case where K has decreased to the reference value or less, the controller 18 does not execute control for changing the bias value (does not increase the bias).

Figure 10:
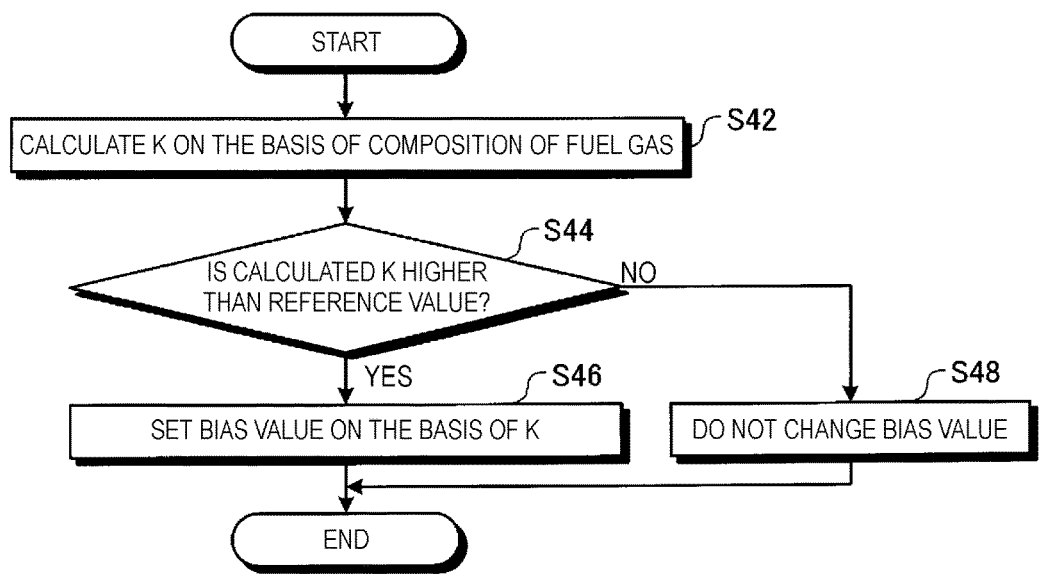
FIG. 10 is a flowchart showing a modified example of a driving operation of a gas turbine system.

Description will be given below of an example of a control operation, using FIG. 10. FIG. 10 is a flowchart showing a modified example of a driving operation of a gas turbine system. Description will be given below of the case of the gas turbine system 10; however, the same applies to the case of the gas turbine system 10a or a gas turbine system of another example. Here, the controller 18 executes the process shown in FIG. 10 as a process for determining the bias value on the basis of the composition of the fuel gas, for example, the process of Step S14 and Step S16 in the flowchart in FIG. 7.

The controller 18 calculates the specific heat ratio K of the combustion gas on the basis of the composition of the fuel gas (Step S42). After calculating the specific heat ratio K of the combustion gas, the controller 18 determines whether the calculated specific heat ratio K of the combustion gas is higher than the reference value (Step S44). In a case where it is determined that the specific heat ratio K is higher than the reference value (Yes in Step S44), the controller 18 sets the bias value on the basis of the specific heat ratio K (Step S46). In this case, since the specific heat ratio K is higher than the reference value, the bias value is decreased. By decreasing the bias value, a state is created where the exhaust temperature is set to be low with respect to the compressed air pressure and it is possible to change to conditions under which it is possible to operate the combustion in the combustor 22 in a safer state. In addition, in a case where it is determined that the specific heat ratio K is not higher than the reference value (No in Step S44), in other words, the specific heat ratio K is determined to be equal to the reference value or less, the controller 18 does not change the bias value (Step S48). In this case, since the specific heat ratio K is equal to the reference value or less, the combustion temperature of the combustor 22 is decreased due to the temperature adjustment control compared to a case where the specific heat ratio K is equal to the reference value. Therefore, it is possible to operate the combustor 22 in a safer state.

The gas turbine system 10 is able to execute control which does not make the bias value higher than the reference value by executing control for adjusting the bias value only in a case where the composition of the fuel gas changes to the over-firing side. Thus, it is possible to safely operate the gas turbine system 10. Here, it is possible to realize such an operation by controlling the bias value using the relationship shown in FIG. 5 described above as the relationship between the specific heat ratio K and the bias value.

In addition, it is preferable that the gas turbine system 10 sets a reference value with respect to K which is a specific heat ratio calculated on the basis of the composition of the fuel gas, and quickly executes a process for decreasing the bias value in a case where K has changed to the over-firing side, in other words, a case where K has increased, and executes a process for increasing the bias value to match the arrival time of the fuel gas in a case where K has changed to the opposite side to the over-firing side, in other words, a case where K has decreased. The gas turbine system 10 is able to shift the timing for adjusting the extent of opening of the control valve by shifting the timing for executing a process on the basis of changes in the bias value.

Figure 11:
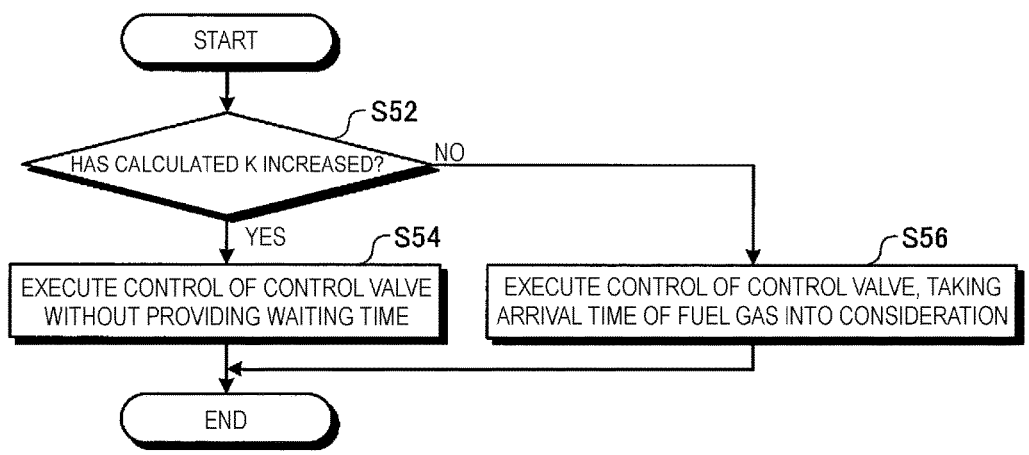
FIG. 11 is a flowchart showing a modified example of a driving operation of a gas turbine system.

Description will be given of an example of a control operation, using FIG. 11. FIG. 11 is a flowchart showing a modified example of a driving operation of a gas turbine system. The controller 18 executes the process shown in FIG. 11 as a process for executing the control of the control valve, for example, the process of Step S22 in FIG. 7.

The controller 18 determines whether the calculated specific heat ratio K has increased (Step S52). The controller 18 executes control of the control valve 34 without providing a waiting time (Step S54) in a case where it is determined that the specific heat ratio K has increased (Yes in Step S52). In this case, the controller 18 controls the control valve 34 so as to achieve the determined control value at the time when a control value is determined. In a case where it is determined that the specific heat ratio K has not increased (No in Step S52), in other words, a case where it is determined that the specific heat ratio K is the same or has decreased, the controller 18 executes control of the control valve 34 while taking the arrival time of the fuel gas into consideration (Step S56). In this case, the controller 18 controls the control valve 34 so as to achieve the determined control value at the time when the measured fuel gas arrives at the control valve 34.

The gas turbine system 10 is able to appropriately control the combustion conditions in the combustor 22 while maintaining a high level of safety by shifting the timing for adjusting the extent of opening of the control valve by shifting the timing for executing the process on the basis of changes in the bias value. Specifically, it is possible to prevent over-firing and thereby to prevent damage to the combustor 22 by quickly executing the process for decreasing the bias value in a case where K has increased and, in contrast, it is possible to prevent changes in the gas turbine output due to changes in the combustion temperature by executing the process for increasing the bias value to match the arrival time of the fuel gas in a case where K has decreased.

Figure 12:
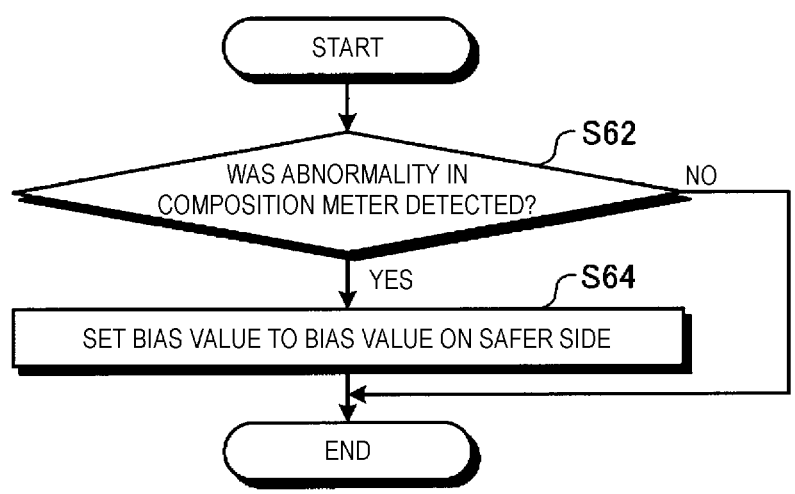
FIG. 12 is a flowchart showing a modified example of a driving operation of a gas turbine system.

In addition, it is preferable that the gas turbine system 10 decreases the bias value in a case where it is detected that the composition meter 50 is abnormal. Description will be given below of an example of a control operation according to the state of the composition meter 50, using FIG. 12. FIG. 12 is a flowchart showing a modified example of a driving operation of the gas turbine system. It is preferable that the controller 18 executes the control shown in FIG. 12 in parallel with the various types of controls described above.

The controller 18 determines whether an abnormality in the composition meter 50 was detected (Step S62). The controller 18 determines that the composition meter 50 is abnormal in a case where a signal providing notification of the occurrence of an abnormality, which is output from the composition meter 50, is detected or in a case of being unable to acquire a measurement result from the composition meter 50. The controller 18 sets the bias value to a bias value on the safer side (Step S64) in a case where it is determined that an abnormality in the composition meter 50 was detected (Yes in Step S62). In other words, the controller 18 further decreases the bias value and changes conditions so as to decrease the output. The controller 18 ends the process directly in a case where it is determined that no abnormality in the composition meter 50 is detected (No in Step S62).

The gas turbine system 10 can be more safely operated, as the gas turbine system 10 sets the bias value to a value for operating under safer conditions in a case where an abnormality in the composition meter 50 is detected.

Figure 13:
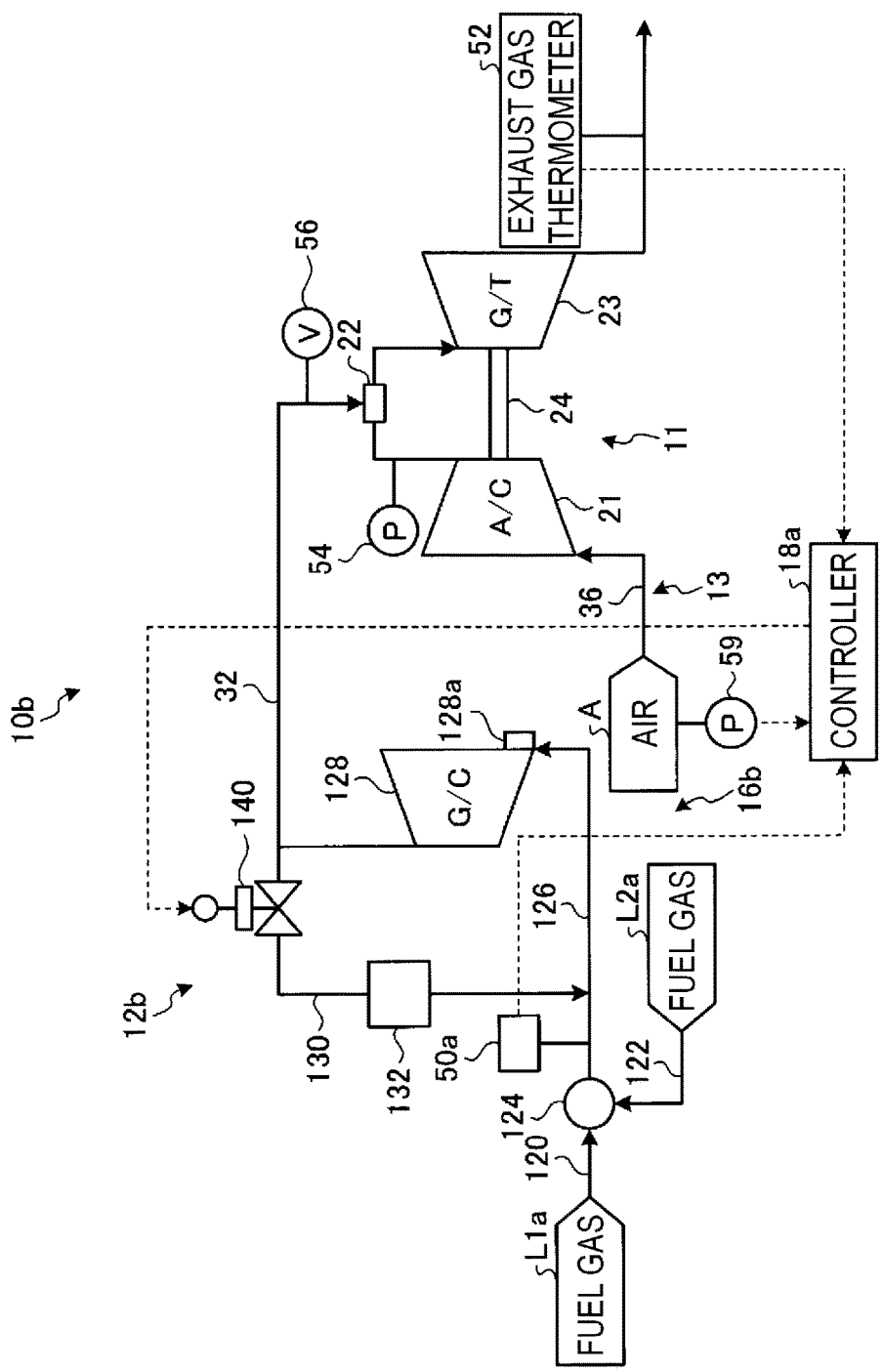
FIG. 13 is a schematic configuration diagram representing a gas turbine system of another embodiment.

FIG. 13 is a schematic configuration diagram representing a gas turbine system of another example. Next, description will be given of another example of a gas turbine system, using FIG. 13. A gas turbine system 10b illustrated in FIG. 13 is also the same as the gas turbine system 10 apart from the configuration on the upstream side of the fuel gas supply line 32. Description will be given of the configuration unique to the gas turbine system 10b. The gas turbine system 10b is a blast furnace gas (BFG) firing gas turbine system and BFG is supplied as a fuel gas L1a and coke oven gas (COG) is supplied as a fuel gas L2a.

A fuel gas supply mechanism 12b of the gas turbine system 10b includes a first fuel gas supply line 120 for supplying the fuel gas L1a, a second fuel gas supply line 122 for supplying the fuel gas L2a, a mixer 124 for mixing the fuel gas L1a supplied from the first fuel gas supply line 120 and the fuel gas L2a supplied from the second fuel gas supply line 122, a mixed fuel line 126 which guides the fuel gas mixed in the mixer 124 and is linked with the fuel gas supply line 32, a gas compressor (G/C) 128 arranged in the mixed fuel line 126, which compresses the mixed fuel gas and increases the pressure, a bypass line 130 which is branched from a part linking the fuel gas supply line 32 and the mixed fuel line 126 and linked with the upstream side of the mixed fuel line 126, a cooler 132 provided in the bypass line 130, and a bypass control valve 140 arranged in the bypass line 130 between the part linking the fuel gas supply line 32 and the mixed fuel line 126 and the cooler 132. In addition, the gas compressor 128 is provided with an inlet guide vane (IGV) 128a for controlling the flow rate at the fuel gas intake port.

In the fuel gas supply mechanism 12b, the fuel gas L1a supplied from the first fuel gas supply line 120 and the fuel gas L2a supplied from the second fuel gas supply line 122 are mixed by the mixer 124 and supplied to the mixed fuel line 126. The fuel gas supplied to the mixed fuel line 126 is increased in pressure by the gas compressor 128 and supplied to the fuel gas supply line 32. Here, in the fuel gas supply mechanism 12b, as it is provided with the bypass line 130, a part of the fuel gas in the mixed fuel line 126 flows into the bypass line 130 in a case where the bypass control valve 140 is open. The fuel gas flowing into the bypass line 130 is supplied to the mixed fuel line 126 after being cooled by the cooler 132 to the same pressure as the mixed fuel gas before being increased in pressure. In this manner, in the fuel gas supply mechanism 12b, a part of the fuel gas circulates in the bypass line 130. In addition, the fuel gas supply mechanism 12b controls the flow rate of the fuel gas supplied to the combustor 22 by controlling the flow rate of the fuel gas circulating in the bypass line 130 using the bypass control valve 140. Thus, the fuel gas supply mechanism 12b is able to continuously supply the gas turbine 11 with fuel gas increased in pressure to a predetermined pressure while reducing the load applied to the gas turbine 11 by circulating a part of the fuel gas.

In an operation information detection unit 16b, a composition meter 50a is provided in the mixed fuel line 126. A controller 18a controls the flow rate of the fuel gas supplied to the combustor 22 by determining the feed rate of the fuel gas in the same manner as for the controller 18 on the basis of the composition of the mixed fuel gas detected by the composition meter 50a, and controlling the extent of opening of the bypass control valve 140 on the basis of the determination.

In addition, the gas turbine system 10b is able to control the output of a gas turbine with high precision by detecting the composition of the fuel gas and correcting the temperature control curve on the basis of K of the combustion gas even in a case where changes in the characteristics of the fuel gas are large, such as in a BFG firing gas turbine system.

In addition, the composition meter 50a is provided in the mixed fuel line 126 in the present embodiment; however, the position at which the composition meter 50a is provided is not limited thereto. For example, the composition meter 50a may be provided in the fuel gas supply line 32 or may be provided in the bypass line 130. In addition, in the gas turbine system 10b, a control valve may be provided in the fuel gas supply line 32 to control the extent of opening of the control valve. In addition, in the gas turbine system 10b, an apparatus such as an electric dust collector may be provided in the mixed fuel line 126 to remove foreign matter contained in the fuel. In addition, two types of fuel gas are mixed in the present embodiment; however, three or more types of fuel may be mixed.

It is also possible to favorably use the gas turbine system of the present embodiment for a low calorie gas firing gas turbine system where changes in the calorie setting occur, in addition to a BFG firing gas turbine system. The gas turbine system of the present embodiment is able to obtain remarkable effects when applied to a system where the calories of the fuel gas are low, the flow rate of the fuel gas is high, and the composition of the fuel gas may change such as the BFG firing gas turbine system or the low calorie gas firing gas turbine system described above.

REFERENCE SIGNS LIST 10, 10a, 10b Gas turbine system
11 Gas turbine
12, 12a, 12b Fuel gas supply mechanism
13 Air supply mechanism
14 Exhaust gas expelling mechanism
16, 16a Operation information detection unit
18 Controller
21 Compressor
22 Combustor
23 Turbine
24 Rotating shaft
32 Fuel gas supply line 34, 106, 108 Control valve
36 Air supply line
38 Exhaust gas line
50, 50a Composition meter
52 Exhaust gas thermometer
54 Compressed air pressure gauge
56, 112, 114 Fuel flow meter
59 Barometer
60 Composition information acquiring unit
62 Operation information acquiring unit
64 Operation processing unit
66 Storage unit
66a Reference data
66b Bias value calculation table
68 Control valve control unit (fuel gas supply mechanism control unit)
80, 82 Temperature control curve
84 Bias value
102, 120 First fuel gas supply line
104, 122 Second fuel gas supply line
124 Mixer
126 Mixed fuel line
128 Gas compressor
130 Bypass line
132 Cooler
140 Bypass control valve

The invention claimed is:

1. A gas turbine system comprising:
a gas turbine having a compressor, a combustor, and a turbine;
a fuel supply mechanism for supplying fuel to the combustor;
a composition detection unit for detecting a composition of the fuel; and
a controller for controlling a flow rate of the fuel supplied from the fuel supply mechanism to the combustor based on a function of an exhaust temperature of combustion gas passing through the turbine and either air pressure of air expelled from the compressor to the combustor or an expansion ratio of the turbine,
the controller calculating a specific heat ratio of the combustion gas from the composition of the fuel detected by the composition detection unit, correcting the function based on the specific heat ratio, and controlling the flow rate of the fuel based on the function corrected previously.

2. The gas turbine system according to claim 1, wherein the controller calculates a composition of the combustion gas based on the composition of the fuel and an intake air flow rate of the compressor, and calculates the specific heat ratio of the combustion gas based on a ratio of each component contained in the combustion gas and a specific heat ratio of the each component.

3. The gas turbine system according to claim 1, wherein the controller calculates a bias value based on the specific heat ratio of the combustion gas and a specific heat ratio of a reference combustion gas and controls the flow rate of the fuel supplied to the combustor based on a function obtained by adding the bias value to the function for the reference combustion gas.

4. The gas turbine system according to claim 1, wherein the fuel supply mechanism mixes a plurality of fuels with different components and supplies mixed fuel to the combustor, and the composition detection unit detects the composition of the mixed fuel based on compositions of the plurality of fuels with different components and a mixing ratio of the plurality of fuels with the different components.

5. A controller for controlling a fuel supply mechanism for supplying fuel to a combustor of a gas turbine, the controller comprising:
a composition information acquiring unit for acquiring composition information of the fuel supplied to the combustor; and
a fuel supply mechanism control unit for controlling a flow rate of the fuel supplied from the fuel supply mechanism to the combustor based on a function of an exhaust temperature of combustion gas passing through a turbine and either air pressure of air expelled from a compressor to the combustor or an expansion ratio of the turbine,
the fuel supply mechanism control unit calculating a specific heat ratio of the combustion gas from the composition information of the fuel, correcting the function based on the specific heat ratio, and controlling the flow rate of the fuel based on the function corrected previously and operation information.

6. A gas turbine operation method for a gas turbine having a compressor, a combustor, and a turbine, a fuel supply mechanism for supplying fuel to the combustor, and a composition detection unit for detecting a composition of the fuel, the method comprising the steps of:
calculating a specific heat ratio of a combustion gas from the composition of the fuel detected by the composition detection unit;
correcting a function of an exhaust temperature of the combustion gas passing through the turbine and either air pressure of air expelled from the compressor to the combustor or an expansion ratio of the turbine, which is determined beforehand, based on the specific heat ratio; and
controlling the fuel supplied from the fuel supply mechanism to the combustor based on the function corrected previously.

* * * * *